(12) United States Patent
Yamauchi (10) Patent No.: US 7,847,993 B2
(45) Date of Patent: Dec. 7, 2010

(54) HOLOGRAM ELEMENT, ILLUMINATOR, AND PROJECTOR

(75) Inventor: Taisuke Yamauchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 12/075,883

(22) Filed: Mar. 15, 2008

(65) Prior Publication Data

US 2008/0231924 A1 Sep. 25, 2008

(30) Foreign Application Priority Data

Mar. 23, 2007 (JP) .............................. 2007-076115

(51) Int. Cl.
*G03H 1/30* (2006.01)
(52) U.S. Cl. .......................................... 359/25; 359/32
(58) Field of Classification Search .................... 359/2, 359/15, 22, 25, 26, 32
See application file for complete search history.

(56) References Cited

U.S. PATENT DOCUMENTS

| 4,374,612 | A | | 2/1983 | Matsumura et al. | |
|---|---|---|---|---|---|
| 5,621,515 | A | * | 4/1997 | Hoshino et al. | 356/71 |
| 5,815,292 | A | * | 9/1998 | Walters | 359/2 |
| 6,226,109 | B1 | * | 5/2001 | Tompkin et al. | 359/2 |
| 7,199,911 | B2 | * | 4/2007 | Hudson et al. | 359/2 |
| 7,229,720 | B2 | * | 6/2007 | Hamada | 430/1 |
| 2001/0005570 | A1 | * | 6/2001 | Daniel et al. | 430/321 |
| 2003/0128862 | A1 | * | 7/2003 | Decker et al. | 382/100 |
| 2005/0063027 | A1 | * | 3/2005 | Durst et al. | 359/2 |
| 2006/0082850 | A1 | * | 4/2006 | Weaver et al. | 359/2 |

FOREIGN PATENT DOCUMENTS

| JP | 2003-270585 A | 9/2003 |
|---|---|---|
| JP | 2003-295744 | 10/2003 |
| JP | 2006-343437 | 12/2006 |

* cited by examiner

*Primary Examiner*—Frank G Font
(74) *Attorney, Agent, or Firm*—AdvantEdge Law Group, LLC (57) ABSTRACT

The disclosure is directed to hologram elements, illuminators, and projectors. In one example, a hologram element comprises a relief structure configured to diffract incident light to form a first illumination pattern and a second illumination pattern on an illuminated surface. The second illumination pattern may form a specific mark for uniquely identifying the hologram element. In certain embodiments, the second illumination pattern is formed outside an illumination area. In other embodiments, the second illumination area is formed inside the illumination area.

12 Claims, 9 Drawing Sheets

HOLOGRAM ELEMENT, ILLUMINATOR, AND PROJECTOR

CROSS-REFERENCE

The present application claims priority from Japanese Patent Application No. 2007-076115 filed on Mar. 23, 2007, which is hereby incorporated by reference in its entirety.

BACKGROUND

A technology using a laser light source as the light source of a projector has been proposed in recent years. A laser light source, as compared with an ultra-high pressure mercury lamp (UHP lamp) that has been used as the light source of a projector, has various advantages including excellent color reproducibility, quick start, and a long life. An illuminator using a laser light source can use a hologram element. A hologram element can diffract laser light to not only shape and enlarge the illumination area but also make the light amount distribution uniform in the illumination area at the same time. The use of a hologram element allows functions that have been assigned to a plurality of elements to be integrated into one element. The use of a hologram element thus allows the optical system to be configured with a smaller number of parts and hence the size and footprint thereof to be more easily reduced. In particular, a surface-relief hologram element, in which a relief structure is provided in the surface of the element, uses only the relief structure to convert the wavefront of light for image reproduction, allowing reduction in size of the optical system as compared with that using a lens or the like. For example, JP-A-2003-270585 has proposed a technology of a projector using a hologram element in its illumination optical system.

SUMMARY

A surface-relief hologram element can be mass-replicated by using mold transfer. A surface-relief hologram element thus has an advantage of being mass-manufacturable by using a simple technique but a disadvantage of being easily replicable by using, as a mold, a surface-relief hologram element removed from a device or the like that has been distributed on the market. Further, from the exterior of a surface-relief hologram element, it is extremely difficult to judge whether the hologram element is a copy illicitly fabricated by a third party or an authentic, proprietary-designed product. Hologram elements of related art, particularly, surface-relief hologram elements, have therefore a risk of being replicated in an illicit manner.

In accordance with certain embodiments described herein, it is possible to provide a hologram element that can be easily distinguished from a replica fabricated in an illicit manner and effectively prevent illicit replication, and an illuminator and a projector can be provided using such a hologram element.

A hologram element according to certain embodiments includes a relief structure that diffracts incident light to form a predetermined illumination pattern on an illuminated surface. The relief structure simultaneously forms first and second illumination patterns on the illuminated surface, the second illumination pattern forming a specific mark accompanying the first illumination pattern.

The hologram element uses the first illumination pattern, for example, to shape the light, which is originally intended. Displaying the specific mark through the second illumination pattern easily allows judgment on whether or not the hologram element is a replica fabricated in an illicit manner by checking if there is the specific mark or not. Displaying the specific mark not only allows easy detection of a malicious replicator but also prevents illicit replication in advance. Since both the first and second illumination patterns are formed by using the entire relief structure of the hologram element, it is virtually impossible to modify a replica fabricated in an illicit manner in such a way that only the second illumination pattern is not displayed. There is thus provided a hologram element that can be easily distinguished from a replica fabricated in an illicit manner and effectively prevent illicit replication.

In certain embodiments, the first illumination pattern may form an illumination area on the illuminated surface, the illumination area shaped and/or having a uniform amount of light distribution. There is thus provided a hologram element that can be used for illumination.

In certain embodiments, the specific mark may include a character. It is thus possible to easily judge whether or not the hologram element is a replica fabricated in an illicit manner. In particular, displaying, for example, the name of the manufacturer of the hologram element can allow effective prevention of illicit replication.

In certain embodiments, the relief structure may not only form an illumination area, which is the first illumination pattern, on the illuminated surface but also form the second illumination pattern outside the illumination area. In this way, the first illumination pattern may be used to illuminate the illumination area, and the second illumination pattern may be used to display the specific mark.

In certain embodiments, the relief structure may form the second illumination pattern to be darker than the first illumination pattern. It is desirable to supply an adequate amount of light to the illumination area, whereas a smaller amount of light may be enough to visually identify the specific mark. In this way, it is possible for light to be efficiently supplied to the illumination area, so that highly efficient illumination can be achieved.

In certain embodiments, the relief structure may not only form an illumination area, which is the first illumination pattern, on the illuminated surface but may also form the second illumination pattern in the illumination area. In this way, the first illumination pattern may be used to illuminate the illumination area, and the second illumination pattern may be used to display the specific mark.

An illuminator according to other embodiments includes a light source that supplies coherent light, and the hologram element that diffracts the coherent light. The use of the hologram element can effectively prevent illicit replication. Accordingly, it is possible to provide an illuminator that can effectively prevent illicit replication.

A projector according to certain embodiments includes the illuminator, and a spatial light modulator that modulates the light from the illuminator according to an image signal. The use of the illuminator can help prevent illicit replication. Accordingly, it is possible to provide a projector that can effectively prevent illicit replication.

BRIEF DESCRIPTION OF THE DRAWINGS

Various embodiments will now be described with reference to the accompanying drawings, wherein like reference numbers refer to like elements.

DESCRIPTION OF EXEMPLARY EMBODIMENTS

Hereinafter, embodiments will be described below in detail with reference to the drawings.

Figure 1:
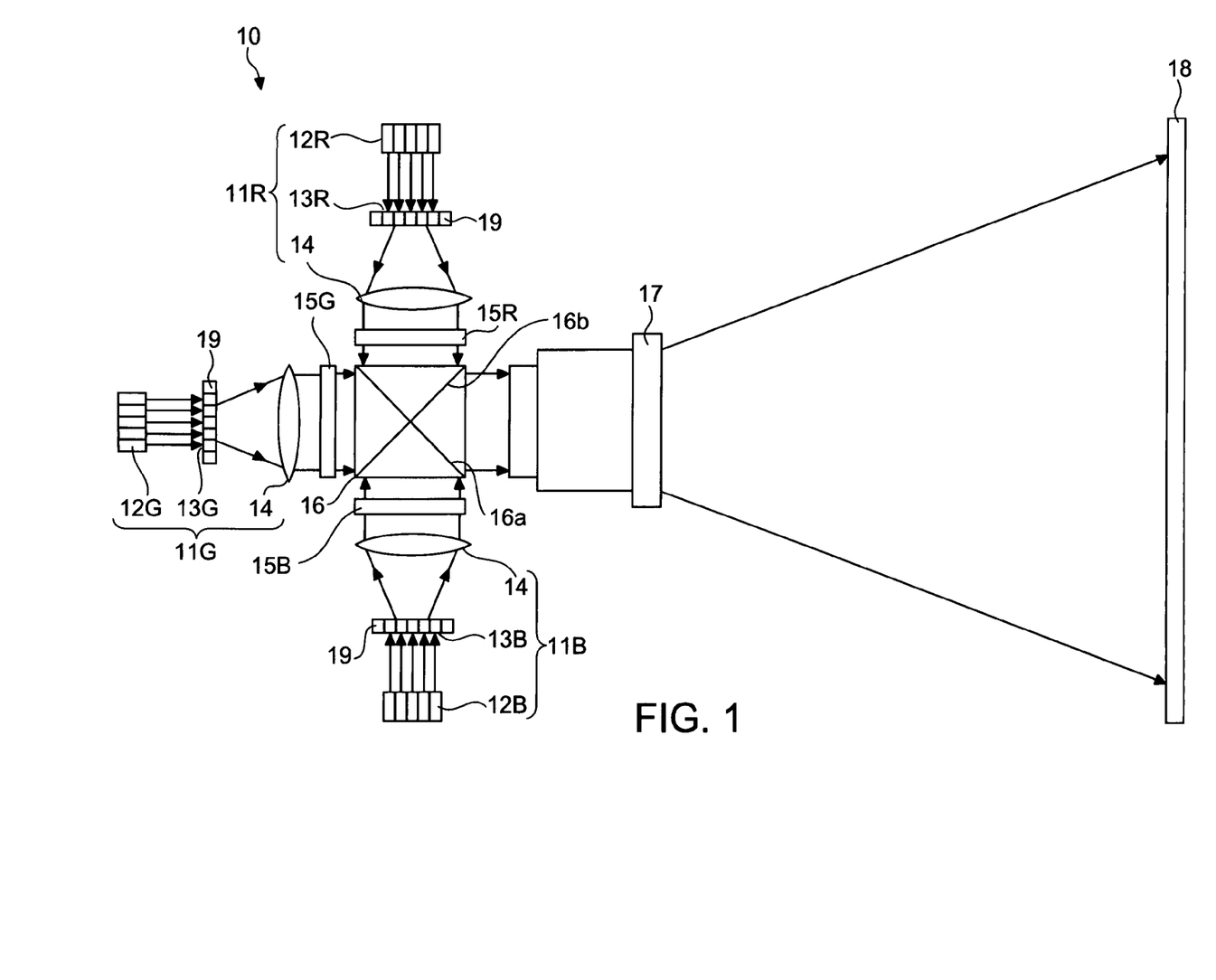
FIG. 1 illustrates a schematic configuration of a projector according to certain embodiments.

FIG. 1 shows a schematic configuration of a projector 10 according to certain embodiments. The projector 10 is a front-projection projector, which supplies light onto a screen 18 and presents an image to a viewer who observes the light reflected off the screen 18. The projector 10 includes an illuminator for red (R) light 11R, an illuminator for green (G) light 11G, and an illuminator for blue (B) light 11B.

Figure 2:
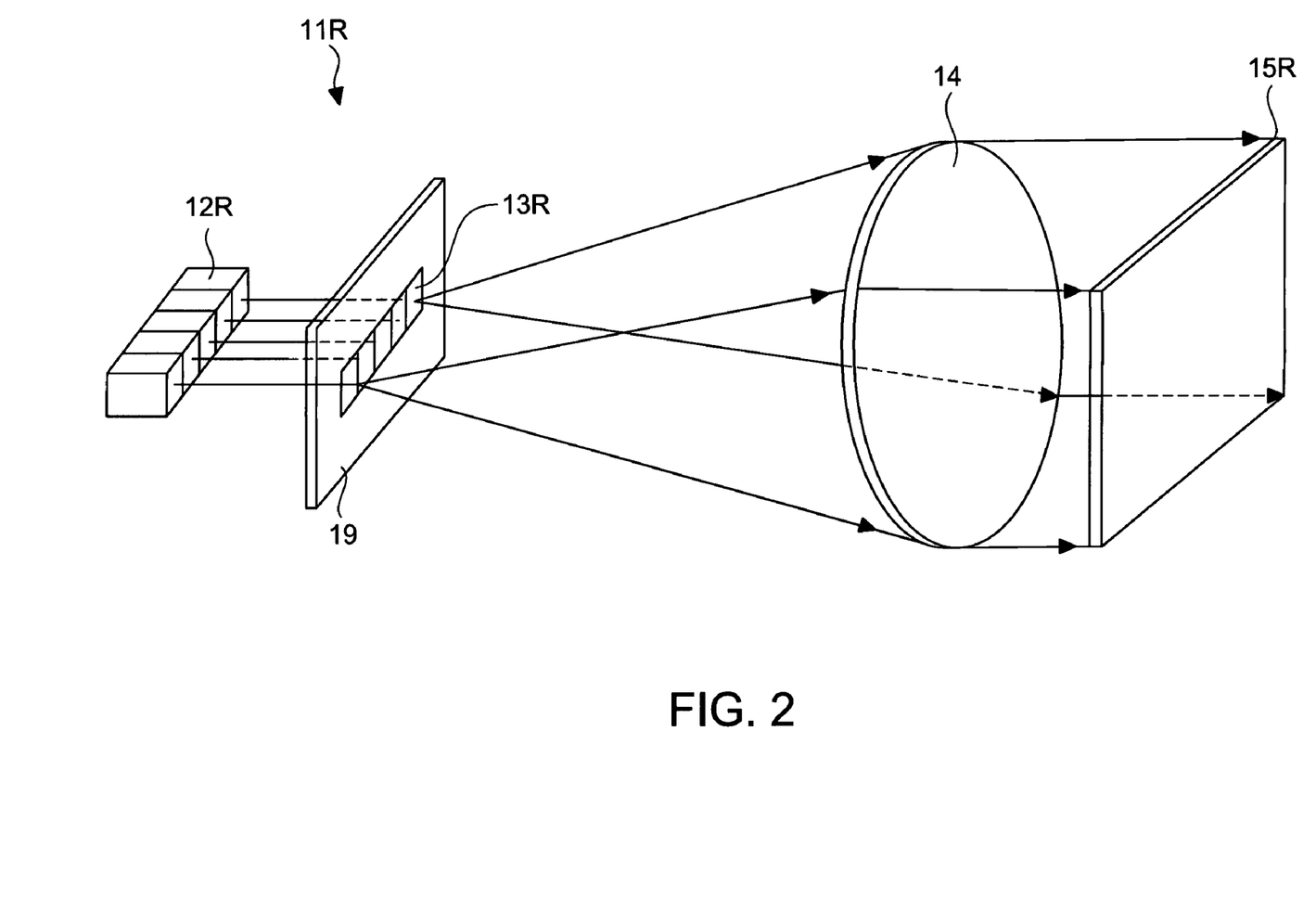
FIG. 2 illustrates an illuminator for R light and a spatial light modulator for R light.

FIG. 2 shows the illuminator for R light 11R and a spatial light modulator for R light 15R. The illuminator for R light 11R is an illuminator that supplies R light. The illuminator for R light 11R includes five light sources for R light 12R, each of which supplies R light. The light source for R light 12R supplies coherent laser light and includes an edge emitting type semiconductor laser. The five light sources for R light 12R are disposed in alignment with one another. Five hologram elements for R light 13R are provided in correspondence to the light sources for R light 12R. The hologram element for R light 13R is a surface-relief hologram. The hologram elements for R light 13R are supported by a support 19.

Figure 3:
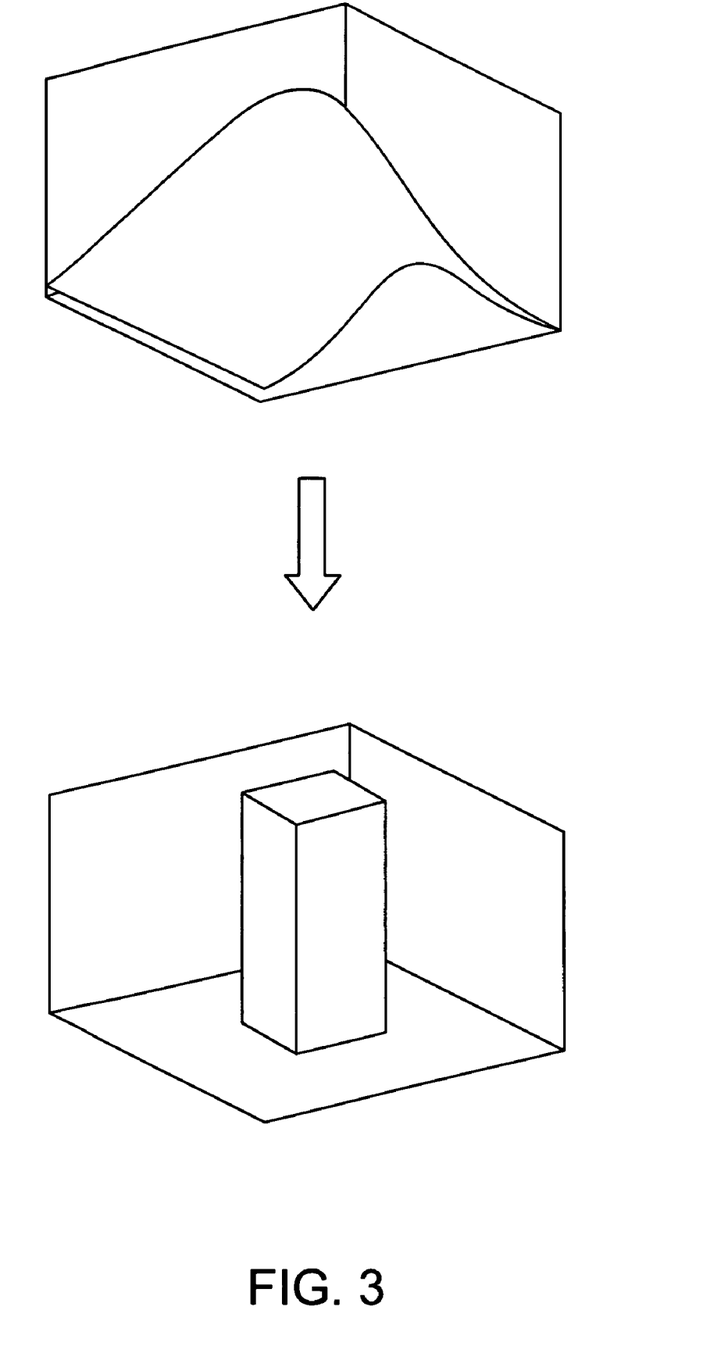
FIG. 3 depicts an example of the light amount distribution of laser light.

FIG. 3 depicts an example of the amount of light distribution of the laser light that is incident on the hologram element for R light 13R, and an example of the amount of light distribution of the laser light that exits from the hologram element for R light 13R. The vertical axis of each graph represents the amount of light, and the horizontal axis represents position. The two graphs are plotted with scales different from each other. The amount of laser light that is incident on the hologram element for R light 13R is distributed in such a way that it decreases toward both ends of the horizontal axis. In contrast, the amount of laser light that exits from the hologram element for R light 13R is distributed in such a way that it is substantially constant in a rectangular area. The hologram element for R light 13R diffracts the laser light from the light source for R light 12R to shape and enlarge the illumination area on an illuminated surface and make the laser light amount distribution uniform in the illumination area. The laser light from each of the hologram elements for R light 13R is superimposed on the spatial light modulator for R light 15R. Since coherent laser light is incident on the hologram element for R light 13R, the hologram element for R light 13R can provide an excellent diffraction characteristic.

Referring back to FIG. 2, a field lens 14 collimates the laser light from each of the hologram elements for R light 13R, and the collimated laser light is incident on the spatial light modulator for R light 15R. The spatial light modulator for R light 15R modulates the R light from the illuminator for R light 11R according to an image signal. Specifically, the spatial light modulator for R light 15R is a transmissive liquid crystal display device. An example of the transmissive liquid crystal display device may be a high temperature polysilicon (HTPS) TFT liquid crystal panel. Referring back to FIG. 1, the R light modulated by the spatial light modulator for R light 15R is incident on a cross dichroic prism 16, which is a light combining system.

The illuminator for G light 11G is an illuminator that supplies G light. The illuminator for G light 11G includes five light sources for G light 12G, each of which supplies G light. The light source for G light 12G supplies coherent laser light and includes a semiconductor laser. The five light sources for G light 12G are disposed in alignment with one another. Five hologram elements for G light 13G are provided in correspondence to the light sources for G light 12G. The hologram element for G light 13G is a surface-relief hologram. The hologram elements for G light 13G are supported by another support 19. The hologram element for G light 13G diffracts the laser light from the light source for G light 12G to shape and enlarge the illumination area and make the laser light amount distribution uniform in the illumination area.

Another field lens 14 collimates the laser light from each of the hologram elements for G light 13G, and the collimated laser light is incident on a spatial light modulator for G light 15G. The spatial light modulator for G light 15G modulates the G light from the illuminator for G light 11G according to an image signal. Specifically, the spatial light modulator for G light 15G is a transmissive liquid crystal display device. The G light modulated by the spatial light modulator for G light 15G is incident on a side of the cross dichroic prism 16 that is different from the side on which the R light is incident.

The illuminator for B light 11B is an illuminator that supplies B light. The illuminator for B light 11B includes five light sources for B light 12B, each of which supplies B light. The light source for B light 12B supplies coherent laser light and includes a semiconductor laser. The five light sources for B light 12B are disposed in alignment with one another. Five hologram elements for B light 13B are provided in correspondence to the light sources for B light 12B. The hologram element for B light 13B is a surface-relief hologram. The hologram elements for B light 13B are supported by another support 19. The hologram element for B light 13B diffracts the laser light from the light source for B light 12B to shape and enlarge the illumination area and make the laser light amount distribution uniform in the illumination area.

Another field lens 14 collimates the laser light from each of the hologram elements for B light 13B, and the collimated laser light is incident on a spatial light modulator for B light 15B. The spatial light modulator for B light 15B modulates the B light from the illuminator for B light 11B according to an image signal. Specifically, the spatial light modulator for B light 15B is a transmissive liquid crystal display device. The B light modulated by the spatial light modulator for B light 15B is incident on a side of the cross dichroic prism 16 that is different from the sides on which the R light and the G light are incident.

The cross dichroic prism 16 has two dichroic films 16a and 16b arranged substantially perpendicular to each other. The first dichroic film 16a reflects the R light and transmits the G and B light. The second dichroic film 16b reflects the B light and transmits the R and G light. The cross dichroic prism 16 combines the R, G, and B light incident from different directions and directs the combined light toward a projection lens 17. The projection lens 17 projects the light combined in the cross dichroic prism 16 toward a screen 18.

Figure 4:
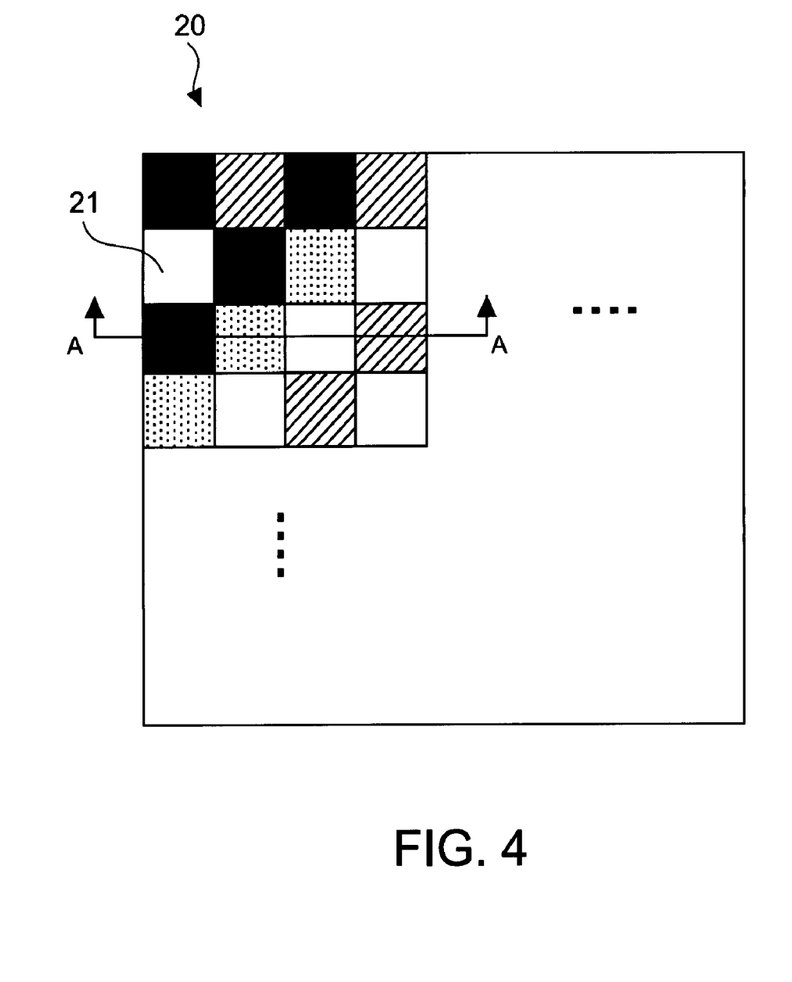
FIG. 4 is a diagram illustrating a relief structure.
Figure 5:
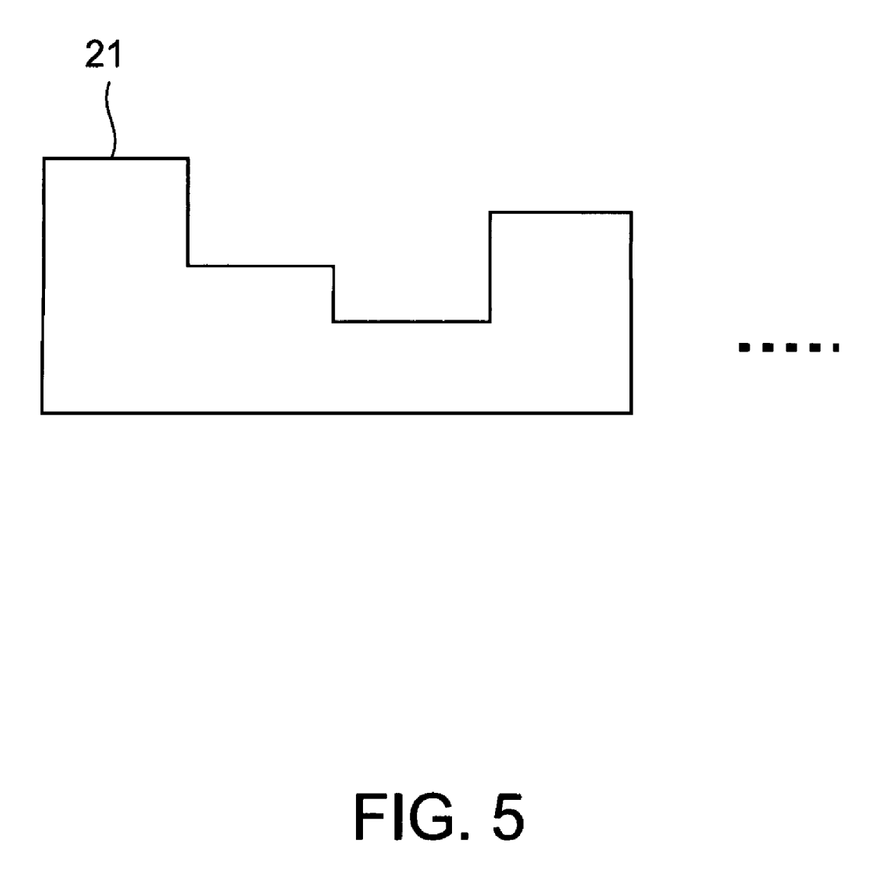
FIG. 5 is a cross-sectional view taken along the line AA shown in FIG. 4.

FIG. 4 is a diagram illustrating a relief structure 20 of each of the hologram elements 13R, 13G, and 13B. FIG. 5 is a cross-sectional view taken along the line AA shown in FIG. 4. The relief structure 20 is provided in the surface of each of the hologram elements 13R, 13G, and 13B, for example, in the exit-side surface from which light exits. The relief structure 20 includes a plurality of projections and depressions, each formed in a rectangular unit area 21. The shape of each of the projections and depressions is rectangular in the cross-sectional view of FIG. 5. In FIG. 4, the variously colored rectangular areas 21 represent levels. In this description, more intensely colored portions mean higher levels, that is, the surfaces of such portions are located closer to the plane of view in FIG. 4.

In each of the hologram elements 13R, 13G, and 13B, each rectangular area 21 in the relief structure 20 changes the phase of the laser light. In each of the hologram elements 13R, 13G, and 13B, the relief structure 20 spatially changes the phase of the laser light to produce diffracted light. By optimizing the surface conditions including the pitch between adjacent rectangular areas 21 and the heights of the projections and depressions in the relief structure 20, each of the hologram elements 13R, 13G, and 13B can obtain a desired function.

Figure 6:
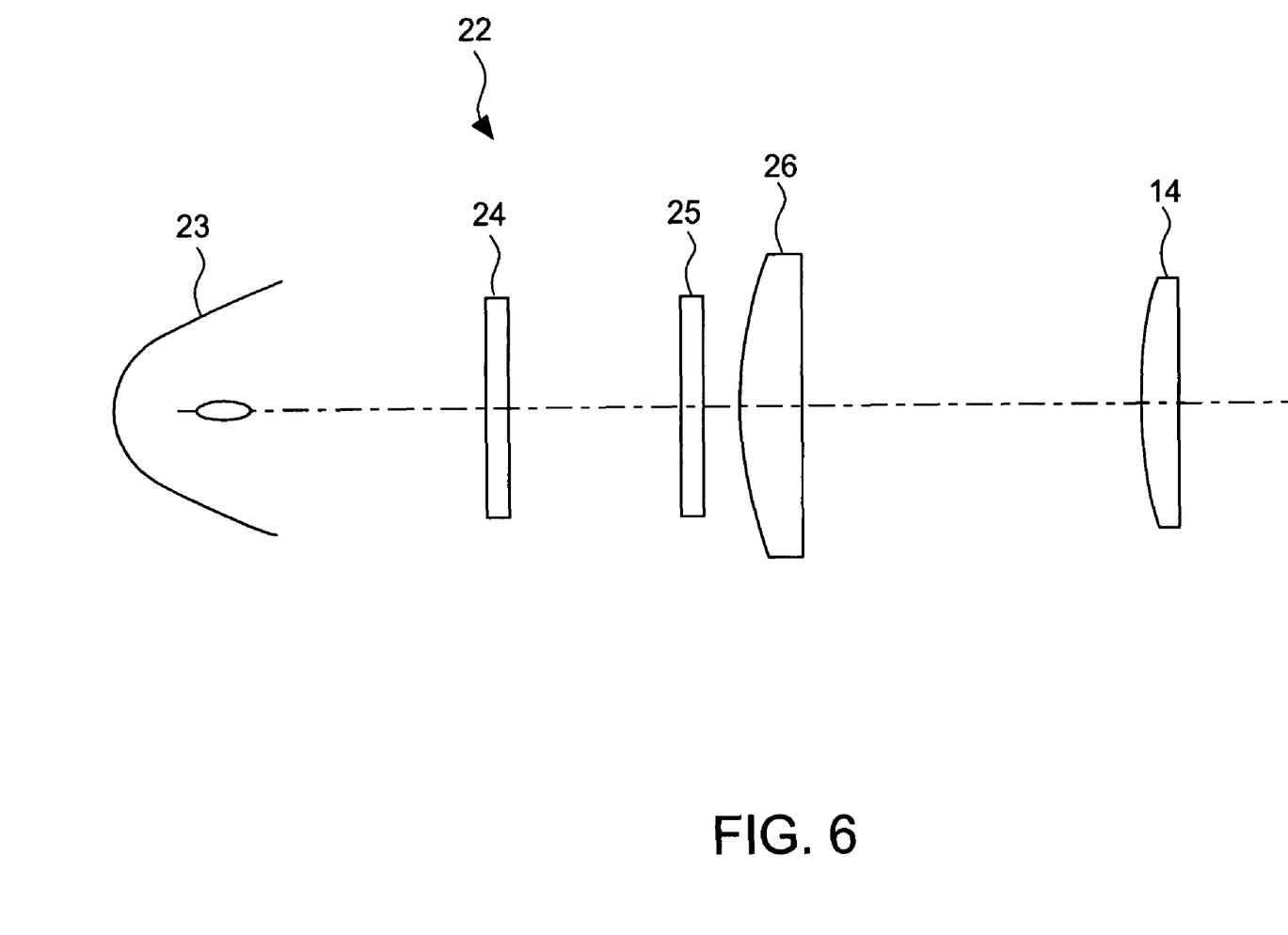
FIG. 6 illustrates a schematic configuration of an illuminator of related art according to a comparative example with certain embodiments.

FIG. 6 shows a schematic configuration of an illuminator 22 of related art according to a comparative example with certain embodiments. The illuminator 22 includes an UHP lamp 23. Each of a first integration lens 24 and a second integration lens 25 includes a plurality of lens elements (not shown) arranged in an array. The first integration lens 24 divides the light flux from the UHP lamp 23 into a plurality of sub-fluxes. The lens elements in the second integration lens 25 form the images of the lens elements in the first integration lens 24 on the illumination area.

A superimposing lens 26 superimposes the images of the lens elements in the first integration lens 24 on the illumination area. The optical elements in the illuminator 22, the first integration lens 24, the second integration lens 25, and the superimposing lens 26, shape and enlarge the illumination area and make the light amount distribution uniform in the illumination area. On the other hand, in accordance with certain embodiments, each of the hologram elements 13R, 13G, and 13B (see FIG. 1) can integrate the functions that have been assigned to a plurality of elements into one element. Each of the hologram elements 13R, 13G, and 13B uses diffraction that occurs in the relief structure 20 to convert the wavefront of the laser light. The use of the hologram elements 13R, 13G, and 13B allows the optical system to be configured with a smaller number of parts and hence the size and footprint thereof may be more easily reduced. Further, use of a relatively inexpensive optical element, such as each of the hologram elements 13R, 13G, and 13B in conjunction with a smaller number of parts described above provides for a reduction in cost.

Figure 7:
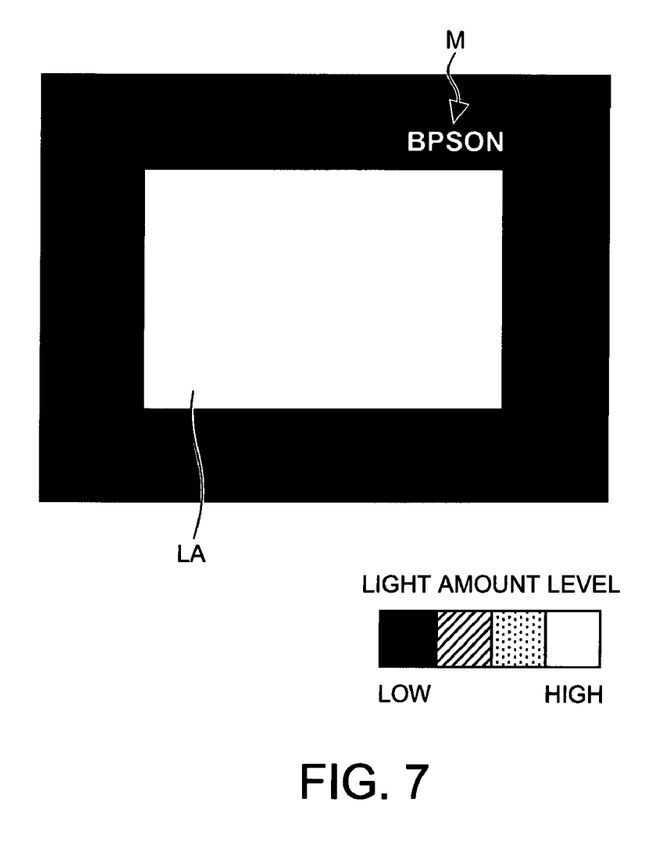
FIG. 7 illustrates an illumination pattern formed by diffraction that occurs in the relief structure.

FIG. 7 shows an illumination pattern formed by the diffraction that occurs in the relief structure 20. The relief structure 20 diffracts the incident light to form a predetermined illumination pattern on the incident-side surface, which is an illuminated surface, of each of the spatial light modulators 15R, 15G, and 15B (see FIG. 1). The relief structure 20 forms an illumination area LA, which is a first illumination pattern, on the illuminated surface. Specifically, the first illumination pattern forms the illumination area LA, which has been shaped and enlarged and has a uniform light amount distribution, on the illuminated surface. Each of the spatial light modulators 15R, 15G, and 15B modulates the light that forms the first illumination pattern.

The relief structure 20 forms a second illumination pattern simultaneously with but different from the first illumination pattern. The second illumination pattern forms a specific mark M accompanying the first illumination pattern. In this embodiment, the specific mark M is a character string formed of alphabetic characters "B", "P", "S", "O", and "N" arranged in a line. The relief structure 20 forms the second illumination pattern outside the illumination area LA, for example, at a position above the illumination area LA and close to a corner thereof. The specific mark M is displayed at a position in each of the spatial light modulators 15R, 15G, and 15B that is above the illumination area LA and close to a corner thereof. The relief structure 20 forms the second illumination pattern roughly as bright as the first illumination pattern. Alternatively, the specific mark M may be displayed on the screen 18 by outputting light that forms the second illumination pattern from each of the spatial light modulators 15R, 15G, and 15B. The relief structure 20 optimized to form the first and second illumination patterns can be designed, for example, by using a predetermined computation method (simulation method), such as iterative Fourier transformation.

It is highly unlikely that a hologram element forms the specific mark M including characters by chance. Therefore, if a product fabricated by a third party carries the specific mark M, the product is proved to be a copy fabricated in an illicit manner. Displaying the specific mark M through the second illumination pattern easily allows judgment on whether or not a hologram element in question is a replica fabricated in an illicit manner by checking if there is the specific mark M or not. Displaying the specific mark M not only allows easy detection of a malicious replicator but also prevents illicit replication in advance. Since both the first and second illumination patterns are formed by using the entire relief structure 20 of each of the hologram elements 13R, 13G, and 13B, it is virtually impossible to modify a replica fabricated in an illicit manner in such a way that only the second illumination pattern is not displayed. It is thus possible to provide easy identification of a replica fabricated in an illicit manner and more effectively prevent illicit replication.

The position where the second illumination pattern is formed is not limited to the position described above as long as it is located outside the illumination area LA. The specific mark M is not limited to a character string, but may be, for example, a symbol or a combination of a character and a symbol. When a symbol is used as the specific mark M, it is desirable to use a complicated shape that is nearly impossible to form by chance. Further, the use of a mark indicative of the manufacturer of the hologram elements 13R, 13G, and 13B as the specific mark M allows the origin of a product in question to be explicitly displayed and illicit replication to be more prevented.

When the second illumination pattern is formed outside the illumination area LA, the relief structure 20 may form the second illumination pattern to be darker than the first illumination pattern. The illuminators 11R, 11G, and 11B desirably supply an adequate amount of light to the illumination area LA, whereas a smaller amount of light will be enough to visually identify the specific mark M. In this way, light can be efficiently supplied to the illumination area LA, so that highly efficient illumination is achieved.

The relief structure is not limited to one having projections and depressions rectangularly shaped in the cross section, but may be the one having projections and depressions triangularly shaped in the cross section. In this case as well, optimizing the surface conditions allows formation of a desired illumination pattern. The relief structure may also have projections and depressions rectangularly shaped and projections and depressions triangularly shaped in the cross section.

Figure 8:
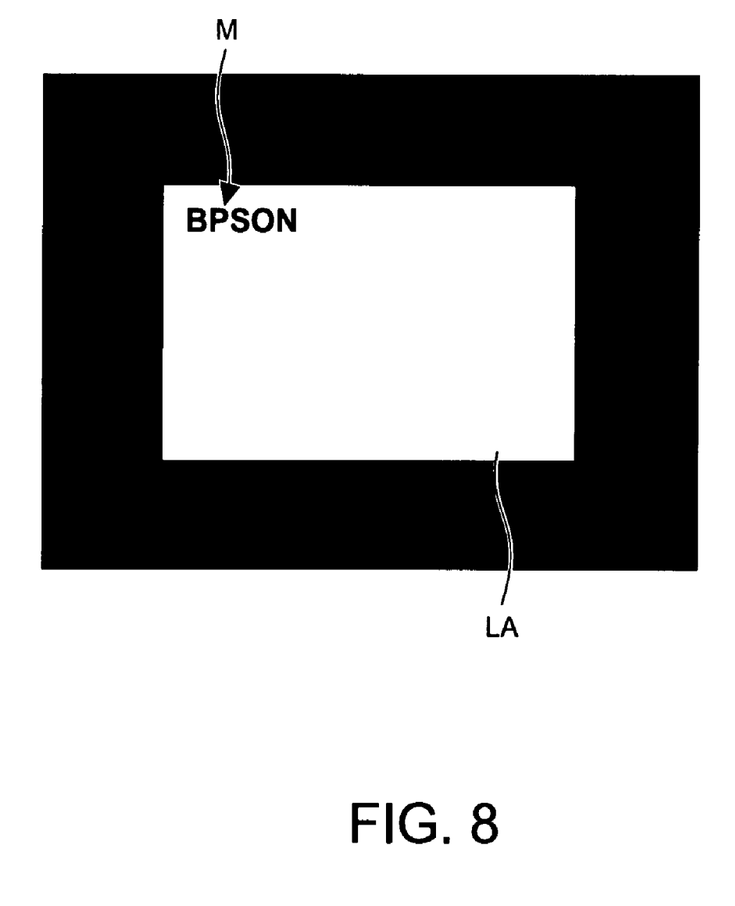
FIG. 8 illustrates a variation of the illumination pattern formed by diffraction that occurs in the relief structure.
Figure 9:
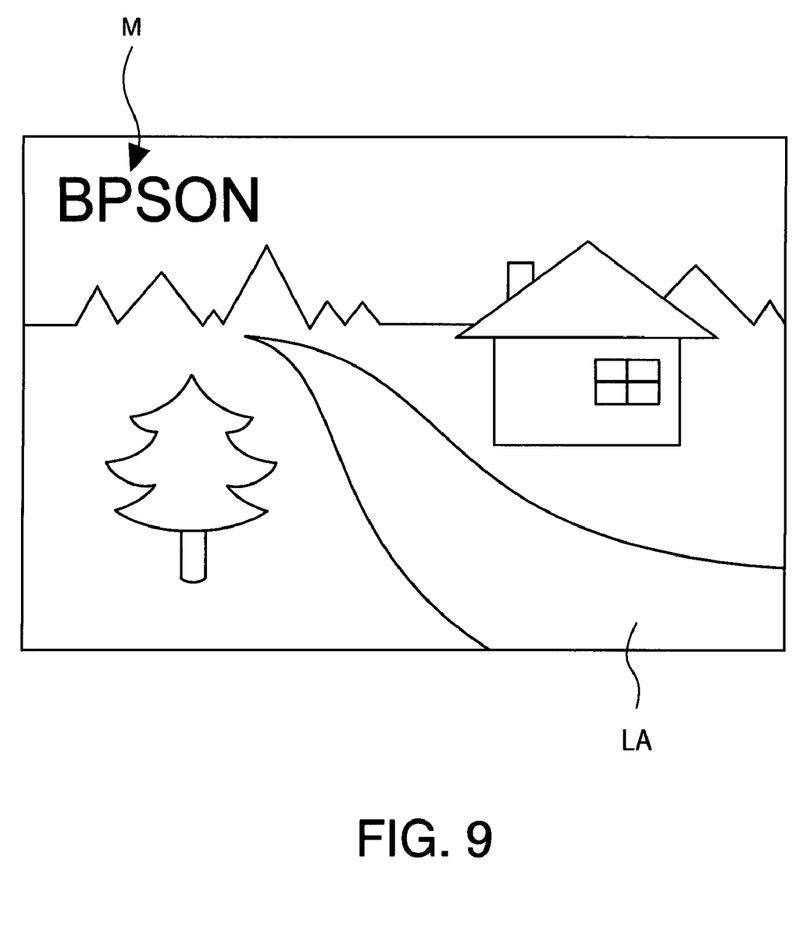
FIG. 9 illustrates a display area and a specific mark on a screen.

FIG. 8 shows a variation of the illumination pattern formed by diffraction that occurs in the relief structure 20. In this variation, the relief structure 20 forms the second illumination pattern in the illumination area LA, for example, at a position close to an upper corner of the illumination area LA. The second illumination pattern is formed by stopping the supply of light to part of the first illumination pattern. As illustrated in FIG. 9, the specific mark M is displayed at a position on the screen 18 that is close to an upper corner of the illumination area LA. The specific mark M is displayed along with an image in such a way that part of the illumination area LA is replaced with a black specific mark M.

In these variations as well, it is virtually impossible to modify a replica fabricated in an illicit manner in such a way that only the second illumination pattern is not displayed. In these variations as well, it is possible to more easily identify a replica fabricated in an illicit manner and more effectively prevent illicit replication. Since the specific mark M can be always displayed during image display, advertising and promotion effects can also be provided by using a mark indicative of the manufacturer as the specific mark M. The position where the second illumination pattern is formed is not limited to the position described in this variation as long as it is located in the illumination area LA. However, to prevent the specific mark M from interfering with image display, the second illumination pattern is desirably formed close to the edge of the illumination area LA.

The hologram elements 13R, 13G, and 13B can be manufactured, for example, by using mold transfer. First, a resist is applied onto a quartz substrate, and an electron beam is applied to the resist to pattern the resist in an electron beam lithography system. Then, the patterned resist undergoes etching, so that a mold made of quartz is formed. Next, the mold and a substrate for forming the hologram elements 13R, 13G, and 13B, such as a film-like member made of a synthetic resin, are heated to the glass-transition temperature of the substrate or higher. After the substrate and the mold are pressed and left in that state for a fixed period, the substrate and the mold are cooled down to the glass-transition temperature of the substrate or lower, and the substrate is separated from the mold. Each of the hologram elements 13R, 13G, and 13B is thus formed with a desired shape transferred to the substrate.

As described above, the hologram elements 13R, 13G, and 13B can be formed by using so-called nano imprinting, in which a mold is first formed and then the shape of the mold is thermally transferred to a substrate. The manufacturing method described herein is presented by way of example, and an arbitrary method can be used as long as the hologram elements 13R, 13G, and 13B, each having a desired shape, can be manufactured.

The configuration of each of the illuminators 11R, 11G, and 11B is not limited to the one having an edge emitting type semiconductor laser as the light source, but may be the one having a surface emitting type semiconductor laser. The configuration of each of the illuminators 11R, 11G, and 11B is not limited to the one having five light sources, but may be one having one or more light sources. Each of the illuminators 11R, 11G, and 11B can be configured to have one or more hologram elements in accordance with the number of light sources. The light source unit may be formed of a plurality of semiconductor lasers as described above, or may be a semiconductor laser having a plurality of light emitting portions.

When coherent laser light is applied to a diffusing surface, an interference pattern, which is called a speckle pattern in which bright and dark points are distributed at random, appears in some cases. When a plurality of light sources or light emitting portions are used, the speckle noise can be reduced by increasing the spectral bandwidth of the laser light to reduce the coherence length. A bright image with high contrast can also be obtained by using a plurality of light sources or light emitting portions to increase the amount of light at the spatial light modulators 15R, 15G, and 15B.

Each of the light sources 12R, 12G, and 12B may be configured to use a wavelength converter, such as a second-harmonic generation (SHG) element, which converts the wavelength of the laser light from a semiconductor laser. Each of the light sources 12R, 12G, and 12B may be a diode pumped solid state (DPSS) laser, solid state laser, liquid laser, gas laser or the like instead of a semiconductor laser.

The projector 10 does not necessarily employ a transmissive liquid crystal display device as the spatial light modulator. Examples of the spatial light modulator may include a liquid crystal on silicon (LCOS) device, a DMD (Digital Micromirror Device), and a GLV (Grating Light Valve). The projector 10 is not necessarily configured to have a spatial light modulator for each color light beam. The projector 10 may be configured to have one spatial light modulator that modulates two, three or more color light beams. The projector 10 is not limited to be configured to use a spatial light modulator, but may be a slide projector using a slide carrying image information. The projector may be a so-called rear projector, which supplies light onto one side of the screen and presents an image to the viewer who observes the light that exits through the other side of the screen.

The illuminator according to certain embodiments may be applied to not only a projector, but also, for example, a direct-view image display in which the viewer directly looks at an image from a spatial light modulator without using a projection system. The illuminator according to certain embodiments may also be applied to an exposure apparatus using laser light for exposure and a monitoring apparatus that monitors an image illuminated with laser light. The hologram element according to certain embodiments is not limited to one that shapes the illumination area and makes the amount of light distribution uniform in the illumination area, but may the one that shapes the illumination area and/or makes the amount of light distribution uniform in the illumination area. Further, the hologram element is not limited to the one that shapes the illumination area and/or makes the light amount distribution uniform in the illumination area, but may be one that divides or deflects the laser light. The hologram element is applicable to any field in which a surface-relief hologram element is used, such as the optical system in a laser beam machine and the optical pickup system in an optical disk reproduction apparatus.

As described above, the hologram element according to certain embodiments is suitably used in the illuminator of a projector.

The preceding is merely a description of several embodiments. While specific embodiments and applications have been illustrated and described, it is to be understood that the precise configuration and components disclosed herein is illustrative only. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents.

What is claimed is:

1. A hologram element comprising:
a relief structure formed on a surface of the hologram element, wherein:
the hologram element is configured such that incident light passes through the hologram element;
the relief structure is configured to diffract the incident light to simultaneously form a first illumination pattern and a second illumination pattern on an illuminated surface, the second illumination pattern forming a specific mark for uniquely identifying the hologram element.

2. The hologram element according to claim 1, wherein the first illumination pattern forms an illumination area on the illuminated surface having a uniform amount of light distribution.

3. The hologram element according to claim 1, wherein the specific mark includes at least one of a character and a symbol.

4. The hologram element according to claim 3, wherein the specific mark includes a name of a manufacturer of the hologram element.

5. The hologram element according to claim 1, wherein the first illumination pattern forms an illumination area on the illuminated surface and the second illumination pattern is formed on the illuminated surface outside of the illumination area.

6. The hologram element according to claim 5, wherein the second illumination pattern is darker than the first illumination pattern.

7. The hologram element according to claim 1, wherein the first illumination pattern forms an illumination area on the illuminated surface and the second illumination pattern is formed in the illumination area.

8. The hologram element according to claim 7, wherein the second illumination pattern is formed in the illumination area by limiting the light to a portion of the illumination area.

9. The hologram element according to claim 1, wherein the relief structure comprises a plurality of projections and depressions having a substantially rectangular shape.

10. The hologram element according to claim 1, wherein substantially the entire relief structure is configured to be used to form the first illumination pattern and the second illumination pattern.

11. An illuminator comprising:
a light source configured to supply coherent light; and
the hologram element according to claim 1 configured to diffract the coherent light.

12. A projector comprising:
the illuminator according to claim 11; and
a spatial light modulator configured to modulate the light from the illuminator according to an image signal.

* * * * *